United States Patent [19]

Schmitt

[11] Patent Number: 5,981,295
[45] Date of Patent: Nov. 9, 1999

[54] AMPULE WITH INTEGRAL FILTER

[75] Inventor: John V. Schmitt, Sunnyvale, Calif.

[73] Assignee: Applied Materials, Inc., Santa Clara, Calif.

[21] Appl. No.: 08/928,553

[22] Filed: Sep. 12, 1997

[51] Int. Cl.$^6$ .................................................. B01L 11/00
[52] U.S. Cl. ........................... 436/180; 436/174; 422/49; 422/81; 422/101; 422/102; 422/103
[58] Field of Search ............................. 422/62, 49, 68.1, 422/81, 99, 100, 101, 102; 436/43, 174, 177, 180, 183

[56] References Cited

U.S. PATENT DOCUMENTS

| | | | |
|---|---|---|---|
| 3,925,048 | 12/1975 | Iung | 62/55 |
| 4,026,673 | 5/1977 | Russo . | |
| 4,436,674 | 3/1984 | McMenamin | 261/64 B |
| 5,156,823 | 10/1992 | Hori et al. | 422/292 |
| 5,215,717 | 6/1993 | Conant et al. | 422/102 |
| 5,268,150 | 12/1993 | Burkitt | 422/102 |
| 5,288,325 | 2/1994 | Gomi | 118/692 |
| 5,520,858 | 5/1996 | Yamaguchi et al. | 261/130 |
| 5,639,427 | 6/1997 | Chenevert et al. | 422/102 |
| 5,659,130 | 8/1997 | Chung et al. | 73/64.47 |
| 5,709,840 | 1/1998 | Juranas | 422/99 |

FOREIGN PATENT DOCUMENTS

| | | |
|---|---|---|
| 651403 | 9/1947 | United Kingdom . |
| 1480911 | 9/1974 | United Kingdom . |
| 5005357 | 10/1978 | United Kingdom . |
| 0584875 | 8/1993 | WIPO . |

OTHER PUBLICATIONS

Search Report issued in PCT/US98/18694 filed Sep. 8, 1998.

*Primary Examiner*—Long V. Le
*Attorney, Agent, or Firm*—Konrad Raynes & Victor

[57] ABSTRACT

A storage device containing a quantity of a liquid chemical substance which is used as a reactant in a chemical process, the device being composed of: a closed container holding the quantity of substance and having a wall provided with an inlet opening and an outlet opening; an inlet valve coupled to said inlet opening, the inlet valve being closeable to block said inlet opening; an outlet valve coupled to the outlet opening, the outlet valve being closeable to block the outlet opening; and a filter interposed between the quantity of liquid and said outlet valve.

26 Claims, 3 Drawing Sheets

5,981,295

AMPULE WITH INTEGRAL FILTER

BACKGROUND OF THE INVENTION

The present invention relates to devices for storing a liquid chemical substance which is used as a reactant in a chemical process, as well as to apparatus containing such a device.

In many industrial chemical processes, a processing chemical is stored in a container in a liquid state and the supply of processing chemical in the container is gradually exhausted as the liquid is converted to a vapor and expelled from the container.

According to one technique currently employed for converting such a processing chemical to a vapor, a fill gas is introduced into the container via an inlet opening at the top of the container. This fill gas creates a high pressure region above the processing chemical. The container is also provided with an outlet line having an outlet pipe which is immersed in the processing chemical and which leads, via a filter and appropriate valves, to a flow control device, such as a liquid mass flow controller. The flow control device delivers the processing chemical to a vaporizer, together with a carrier gas. Within the vaporizer, the carrier gas mixes with the processing chemical to produce a vapor which is then delivered to the processing station. The processing station may be composed of a process chamber whose interior is maintained at a low pressure that acts to draw the vapor from the vaporizer.

In apparatus of the type described above, both the vaporizer and the flow control device normally contain orifices of very small size, in the range of 0.001 to 0.030 inch diameter. These orifices can be easily clogged or blocked by particles contained in the processing chemical. These particles may be present in the processing chemical when it is initially supplied to the apparatus, or can be created by reactions occurring between the processing chemical and the fill gas. Such particles can also be constituted by precipitates resulting from normal decomposition or aging of the processing chemical, or can result from corrosion of the components through which the processing chemical flows. Since such particles would rapidly clog or block or restrict orifices in the flow control device and/or the vaporizer, the filter upstream of the flow control device is often an important component of such apparatus.

However, since the purpose of the filter is to trap particles, the filter itself gradually becomes clogged and after a certain period of use, the filter usually must be replaced. In current state-of-the-art apparatus, filter replacement is associated with a number of serious drawbacks and difficulties.

For example, in order to replace the filter, the apparatus is typically shut down, not only to allow removal of the used filter and installation of a fresh filter, but also because filter replacement is usually accompanied by a relatively lengthy purging operation during which associated carrier lines are re-filled with the desired composition of carrier gas and chemical.

Furthermore, the types of processing chemicals employed in such apparatus are generally highly corrosive and/or toxic. Therefore, the process of removing a used filter is complicated by the need to assure operator safety. Handling and disposal of used filters therefore presents special safety issues and adds to the cost of operating the apparatus.

The problems posed by the removal, handling and disposal of these used filters are generally greater than similar problems associated with the replacement of a container whose supply of processing chemical has been exhausted. Such containers are normally equipped with inlet and outlet valves that must be closed before a used container can be removed. Therefore, although removal of a used container and installation of a fresh container must be effected in a careful manner, the safety problems associated therewith are typically less severe than those associated with removal of a filter.

FIG. 1 is a block diagram illustrating a portion of conventional apparatus in which such a filter is provided. This apparatus includes a container 2, of a type commonly referred to as an ampule, which is a sealed container supplied with a quantity of a chemical substance 4 in the liquid state. The upper portion of the interior of container 6 defines a head space 6 which is coupled, via an inlet opening in the lid, or top wall, of container 2, to an inlet line containing a manual valve 10. The inlet line will be connected to conduct a fill gas which is introduced into head space 6 in order to place liquid 4 under pressure. An outlet pipe 12 extends into container 6 via an outlet port located in the top wall of container 2. Pipe 12 has an inlet end which is immersed in liquid 4, typically at a level close to the bottom of container 2. Liquid chemical substance 4 is delivered to a vaporizer via pipe 12, manual valve 16, pneumatically-controlled valves 18 and 20, and filter 22. Valves 10 and 16 are typically secured to container 2 in a manner to be removed together with container 2 at the time of container replacement. Couplings 62 and 64 may be decoupled to permit removal of container 2 and valves 10 and 16. Prior to removal, valves 10 and 16 are closed and couplers 62 and 64 are purged by means of purge gas and vacuum lines 23a, 23b and 23c.

The flow path which includes valves 18 and 20 and filter 22 is further bridged by a bypass valve 24 which permits the filter 22 to be bypassed if necessary to maintain operation while the filter is replaced. The bypass line of valve 24 may similarly have a filter (not shown) to filter the flow while the other filter is being replaced. Prior to replacement of filter 22, valves 18 and 20 may be closed. The filter 22 may then be purged by passing a purge gas through the filter from a purge gas line 26a coupled to the filter. The purge gas and chemical residue is withdrawn through a vacuum line 26b.

BRIEF SUMMARY OF THE INVENTION

It is an object of the present invention to simplify the removal of the filter provided to prevent flow of particles to the flow control device and vaporizer of apparatus of the type described above.

Another object of the invention is to reduce the time required to replace such a filter.

A further object of the invention is to reduce operator exposure to hazardous chemicals during such replacement.

Still another object of the invention is to substantially reduce the time required to effect replacement of such a filter.

The above and other objects are achieved, according to the present invention, by a storage device containing a quantity of a liquid chemical substance which is used as a reactant in a chemical process, the device comprising:

a closed container holding the quantity of substance and having a wall provided with an inlet opening and an outlet opening;

an inlet valve coupled to the inlet opening, the inlet valve being closeable to block the inlet opening;

an outlet valve carried by the container and coupled to the outlet opening, the outlet valve being closeable to block the outlet opening; and a filter interposed between the quantity of liquid and the outlet valve.

DETAILED DESCRIPTION OF THE INVENTION

Figure 1:
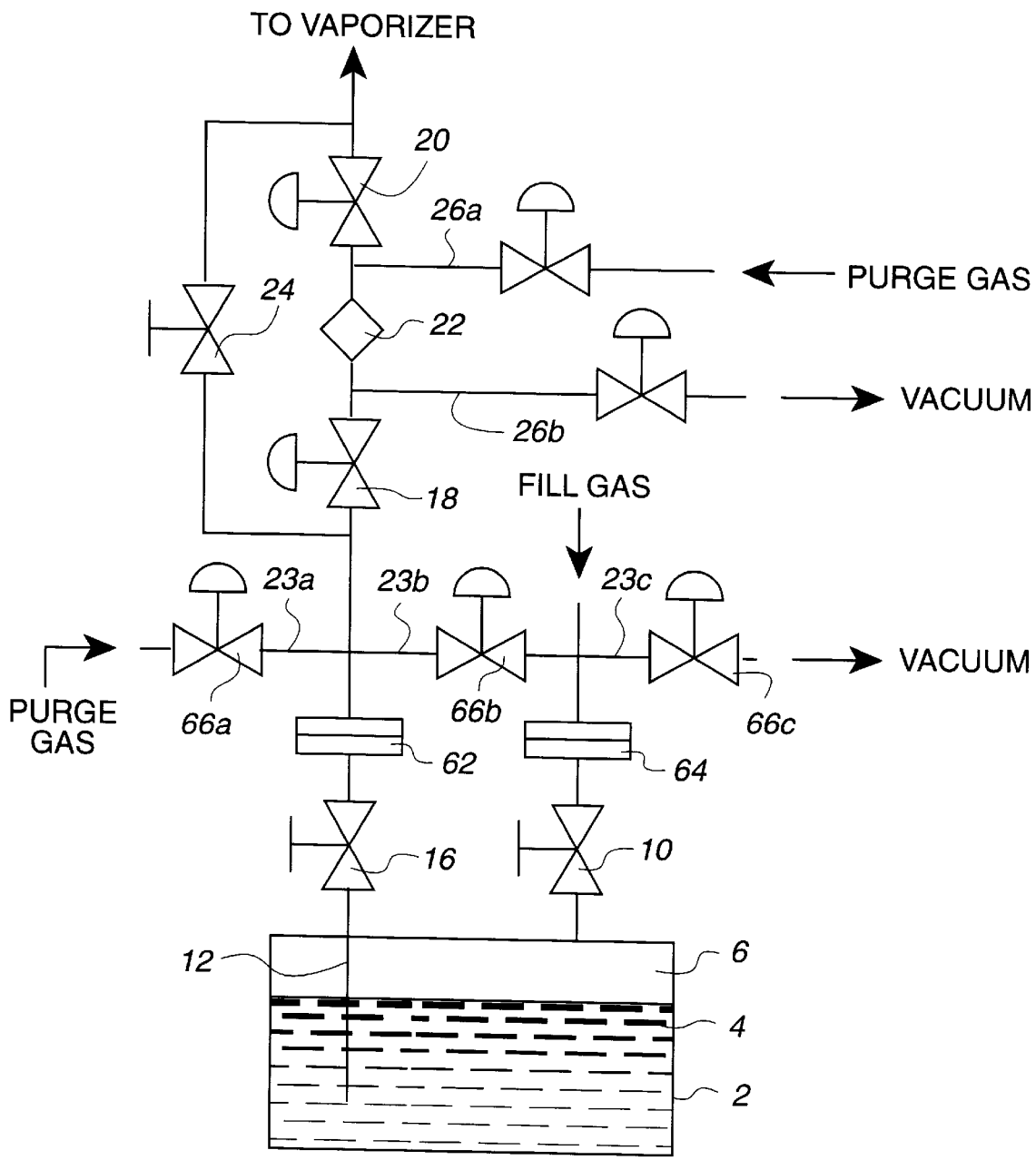
FIG. 1 is a schematic diagram illustrating a portion of an apparatus according to the prior art.
Figure 2:
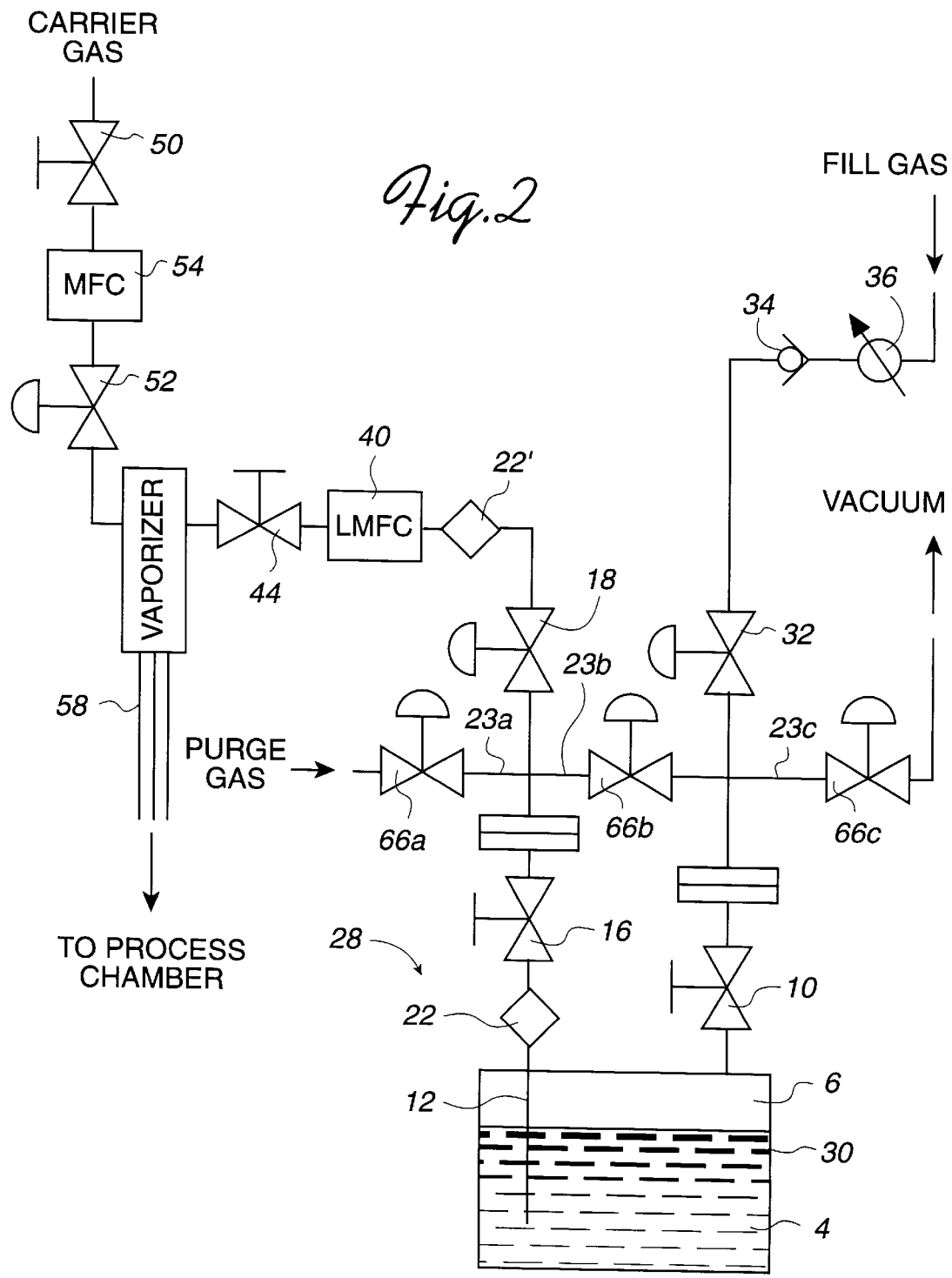
FIG. 2 is a schematic diagram illustrating one embodiment of apparatus including a storage device according to the present invention.

FIG. 2 illustrates a conventional vapor generating system equipped with a storage device 28 according to the invention. Those components which are identical to components shown in FIG. 1 are identified by the same reference numeral.

In the apparatus shown in FIG. 2, the storage device 28 includes an ampule 30 containing a body of liquid 4, above which is provided head space 6, in the same manner as in the structure shown in FIG. 1. Also as shown in FIG. 1, an inlet line at the top of ampule 30 is connected to manual valve 10. Fill gas is supplied to head space 6 via a flow line which contains valve 10, as well as a further pneumatically controllable valve 32, a one-way valve 34 and a regulator 36.

In the device according to this illustrated embodiment of the invention, filter 22 is disposed between outlet pipe 12 and manual control valve 16 to provide a self-contained filter and container unit. As explained in greater detail below, such an arrangement facilitates removal and replacement of the filter at the same time as the container to provide improved safety and efficiency.

The outlet line further includes valve 18 and a flow control device in the form of liquid mass flow controller 40. The liquid processing chemical is delivered to a vaporizer 42 via a further valve 44.

A carrier gas is also delivered to vaporizer 42 via a flow path which includes two control valves 50 and 52 and a mass flow controller 54. Within vaporizer 42, the carrier gas is mixed with the liquid chemical and the mixture is conducted to a heated section 58, a vapor being formed in vaporizer 42 and heated section 58. The resulting vapor is then delivered to a process chamber.

FIG. 2 further shows, at 22', one typical location for filter 22 according to the prior art.

The apparatus shown in FIG. 2 can form part of, for example, a chemical vapor deposition system which uses, as the liquid chemical 4, a product such as that sold under the trade name Cupraselect. A vapor containing this chemical is delivered, from vaporizer 42 and heated section 58, to a chemical vapor deposition chamber where a layer, or film, of copper is deposited on a substrate such as a semiconductor wafer. In this case, the carrier gas may be, for example, helium.

When filter 22 has the location shown in FIG. 2, it can be permanently fitted to ampule 30, together with valves 10 and 16. A suitable separable fitting or coupling 62 is provided between valves 16 and 18 and an identical separable coupling 64 is provided between valves 10 and 32. One part of each coupling may be permanently secured to an associated valve.

When the level of liquid chemical 4 within ampule 3 decreases to a point at which ampule 30 must be replaced by a fresh ampule, valves 10, 16, 18 and 32 are closed and the couplings 62 and 64 purged of the chemical by use of purge gas and vacuum lines 23a, 23b and 23c. For example, valve 66a of purge gas line 23a is opened as is valve 66b of purge gas line 23b to admit a flow of purge gas to couplings 62 and 64. Thereafter, valve 66a may be closed while valve 66c of vacuum line 23c is opened to draw the purge gas and residual chemical from couplings 62 and 64. This process may be repeated as necessary to purge the couplings.

Once the couplings have been satisfactorily purged, the valves 66a, 66b and 66c are all closed. Thereafter, the two parts of each fitting 62, 64 are separated from one another and the container unit 28 composed of valves 10 and 16, filter 22 and ampule 30 is removed for disposal or transport to a refilling facility.

A fresh container unit 28 containing a filled ampule 30 and a clean filter 22 is then attached to the system at couplings 62 and 64. Thus, it is seen that by replacing container unit 28, the filter 22 may, in accordance with the present invention, be automatically replaced at the same time as the ampule 30, thereby obviating the need for a separate filter changing operation.

If ampule 30 is to be refilled rather than disposed of, such refilling operation will typically be accompanied by replacement or cleaning of filter 22 of container unit 28 at the same time. Such cleaning or replacement of the filter 22 can be accomplished safely at a facility which is designed to perform a refilling operation.

Figure 3:
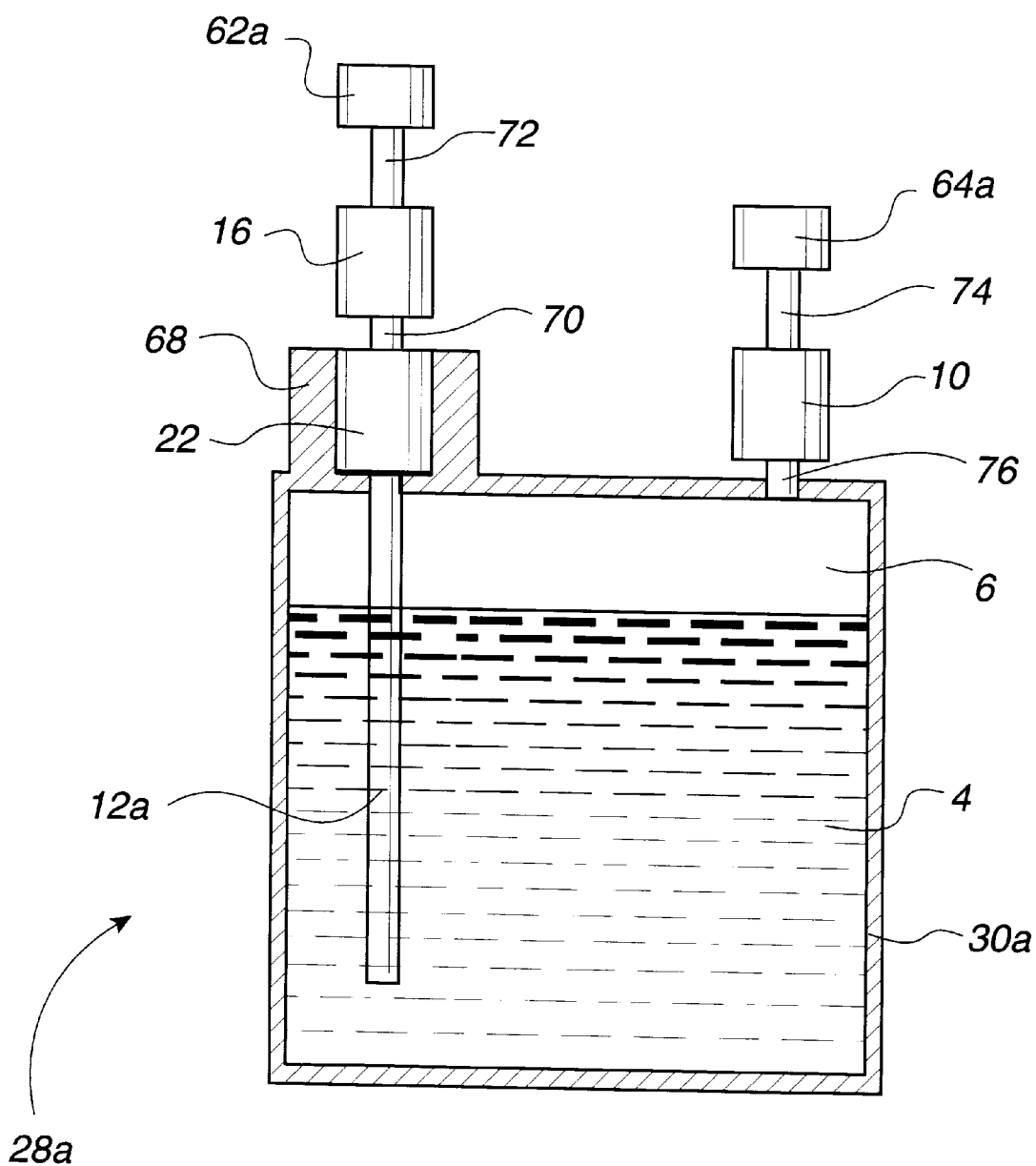
FIG. 3 is a simplified elevational, cross-sectional view of one embodiment of a storage device according to the present invention.

FIG. 3 is an elevational, pictorial view showing the components of a container unit 28a according to an alternative embodiment of the invention, the unit having been removed from the apparatus of FIG. 2. The inlet of filter 22 is secured to the outlet end of outlet pipe 12a at the top of ampule 30a. Filter 22 may be fully enclosed in a protective housing 68 which may be integrally formed with walls of the ampule 30a or fastened to the ampule walls by welding or other suitable leakage resistant fasteners or couplers. The outlet of filter 22 is coupled to a second outlet pipe 70 which passes through an appropriate sealed aperture in the filter housing 68 to the inlet of the outlet line control valve 16. The outlet of control valve 16 is in turn coupled by a third outlet pipe 72 to one part 62a of coupling 62. In a similar manner, the inlet of inlet control valve 10 is coupled by an inlet pipe 74 to one part 64a of coupling 64. The outlet of inlet control valve 10 is coupled by a second inlet pipe 76 to an ampule inlet in the walls of the ampule 30.

It is preferred that the container unit 28a depicted in FIG. 3 be constructed so that the various components including the filter 22, filter housing 68, inlet and outlet pipes 70, 72, 74 and 76, control valves 10 and 16 and coupling parts 62a, 64a, are all structurally supported by the ampule 30a and securely connected to the ampule 30a to facilitate handling and transport of the container unit 28a as a unit. For example, the ampule 30a, filter 22, filter housing 68, inlet and outlet pipes 70, 72, 74 and 76, control valves 10 and 16 and coupling parts 62a, 64a, may be welded or otherwise permanently fastened or coupled together as a unit as shown to ensure that the container unit 28a is disconnected from the system only by disconnecting the couplings 62a and 64a from their counterparts of the couplings 62 and 64, respectively. Alternatively, releasable couplers may be used to assemble the components of container unit 28a but preferably such couplers should be significantly more difficult to disconnect than the coupling parts 62a and 64a from their counterpart coupling parts to reduce the chance of improper or unauthorized disassembly of the container unit 28a.

Because filter 22 is mounted atop ampule 30a, valve 10 and coupling part 64a can be disposed at a lower elevation above the top of ampule 30 than are valve 16 and coupling part 62a. This difference in height provides a safety feature in that it will deter incorrect installation of the unit in the chemical processing system in which the inlet and outlet lines are inadvertently reversed.

It should be readily apparent that the invention can utilize any known type of chemical container and filter. It is presently proposed to construct a prototype using, as ampule 30 or 30a, an ampule marketed under the designation Sschumacher BK1200 SSA or BK1200 SSG, together with a filter marketed by the SWAGELOK Company, under the product designation NUPRO, model type SS-4 FWS-VCR-05, this being a 0.5 micron filter. For fabrication of this prototype, valve 16, which is a manual valve, and which is initially fitted to the ampule, will be removed and the filter 22 will be mounted on the top surface of ampule 30 between that top surface and manual valve 16.

However, it is to be understood that the specific products mentioned above are identified only be way of non-limiting example and are intended simply to provide all appropriate information presently known about the intended initial implementation of the invention.

It will be appreciated that the invention offers a number of advantages, one significant advantage being that the only system down time or loss of filtering will be that associated with replacement of an ampule, so that no additional down time will be associated with replacement of the filter. In addition, the purge routines required when changing an ampule, which routines will take place with the valves closed, will be sufficient to satisfy any purging previously required by the filter itself. Replacement of the filter does not require any special actions on the part of an operator at the processing installation and that operator will not be subjected to any additional risks of exposure to hazardous chemicals as a result of a separate filter replacement operation. All handling and disposal of the filter itself can be performed by the supplier of filled ampules, who can be expected to be properly equipped to safely handle and dispose of the filter or its contents.

If disruption of the flow of the chemical is to be avoided during replacement of a container unit 28 or 28a, the system may be provided two such container units in parallel. As a result, when one container unit needs to be replaced, the flow path can be switched to permit the other container unit to provide the chemical while the first container unit is replaced, and vice-versa.

While particular embodiments of the present invention have been shown and described, it will be understood by those skilled in the art that changes and modifications may be made without departing from this invention in its broader aspects and, therefore, the aim in the appended claims is to cover all such changes and modifications as fall within the true spirit and scope of this invention.

What is claimed is:

1. A liquid chemical storage device for containing a quantity of a liquid chemical substance which is used as a reactant in a chemical process in a semiconductor manufacturing system having first and second coupling parts for mating with a liquid chemical storage device, said device comprising:

a portable, closed container adapted to hold the quantity of substance and having a wall provided with an inlet opening and an outlet opening;

an inlet valve carried by said container and fluidically coupled to said inlet opening, said inlet valve being closeable to block said inlet opening;

an inlet coupling part carried by said container and fluidically coupled to said inlet valve and adapted to selectively mate with and separate from said system first coupling part;

an outlet valve carried by said container and fluidically coupled to said outlet opening, said outlet valve being closeable to block said outlet opening;

an outlet coupling part carried by said container and fluidically coupled to said outlet valve and adapted to selectively mate with and separate from said system second coupling part; and a filter interposed between the quantity of liquid and said outlet valve.

2. The device according to claim 1 wherein said filter is interposed between said outlet opening and said outlet valve.

3. The device according to claim 2 wherein said filter blocks flow of solid particles through said outlet valve.

4. The device according to claim 2 wherein said filter is permanently secured to said container.

5. The device according to claim 2 wherein said container, said valves and said filter constitute a replaceable unit.

6. The device according to claim 1 wherein said filter blocks flow of solid particles through said outlet valve.

7. The device according to claim 1 wherein said filter is permanently secured to said container.

8. The device according to claim 1 wherein said container, said valves and said filter constitute a replaceable unit.

9. Apparatus for performing a chemical process in a semiconductor manufacturing system having first and second coupling parts for mating with a liquid chemical storage device for containing a quantity of a liquid chemical substance which is used as a reactant in said chemical process, said apparatus comprising:

a portable, closed container adapted to hold the quantity of substance having a wall provided with an inlet opening and an outlet opening; said container having an inlet valve carried by said container and fluidically coupled to said inlet opening, said inlet valve being closeable to block said inlet opening; an inlet coupling part carried by said container and fluidically coupled to said inlet valve and adapted to selectively mate with and separate from said system first coupling part; an outlet valve carried by said container and fluidically coupled to said outlet opening, said outlet valve being closeable to block said outlet opening; an outlet coupling part carried by said container and fluidically coupled to said outlet valve and adapted to selectively mate with and separate from said system second coupling part; and a filter interposed between the quantity of liquid and said outlet valve; and a processing chamber fluidically coupled to said system second coupler part;

wherein said outlet coupling part is mated to said system second coupling part to provide a flow path between said outlet valve and said processing chamber.

10. The apparatus according to claim 9 wherein said filter is interposed between said outlet opening and said outlet valve.

11. The apparatus according to claim 9 wherein said filter blocks flow of solid particles through said outlet valve.

12. The apparatus according to claim 9 wherein said filter is permanently secured to said container.

13. The apparatus according to claim 9 wherein said container, said valves and said filter constitute a replaceable unit.

14. The apparatus according to claim 9 further comprising:
- source of a fill gas fluidically coupled to sad system first coupling part;
- wherein said inlet couplin part is mated to said system first coupler part to provide a flow path between said inlet valve and said source of fill gas.

15. In a method for performing a chemical process in a semiconductor manufacturing system having first and second coupling parts for mating with a liquid chemical storage device for containing a quantity of a liquid chemical substance which is used as a reactant in said chemical process, which method includes delivering the liquid chemical substance from said storage device to a processing chamber, the improvement comprising, after at least a portion of the liquid chemical substance has been delivered from said device;
- closing an inlet valve carried by a portable, closed container adapted to hold the quantity of substance, said inlet valve being fluidically coupled to an inlet opening in a wall of said container, wherein closing said inlet valve blocks said inlet opening of said container;
- closing an outlet valve carried by said container and fluidically coupled to an outlet opening in a wall of said container, wherein closing said outlet blocks said outlet opening of said container;
- disconnecting said container from said system by separating an inlet coupling part carried by said container from said system first coupling part, said container inlet coupling part being fluidically coupled to said inlet valve and adapted to selectively mate with and separate from said system first coupling part; and by separating an outlet coupling part carried by said container from said system second coupling part, said container outlet coupling part being fluidically coupled to said outlet valve and adapted to selectively mate with and separate from said system second coupling part wherein said container further has a filter interposed between the quantity of liquid substance and said outlet valve; and
- connecting a second portable, closed container filled with the liquid chemical substance and having inlet and outlet coupling parts to said system by mating said inlet and outlet coupling parts of said second container to said system first and second coupling parts, respectively.

16. The method according to claim 15 wherein said filter is interposed between said outlet opening and said outlet valve.

17. The method according to claim 16 wherein said filter blocks flow of solid particles through said outlet valve.

18. The method according to claim 16 wherein said filter is permanently secured to said container.

19. The method according to claim 16 wherein said container, said valves and said filter constitute a replaceable unit.

20. The method according to claim 15 wherein said filter blocks flow of solid particles through said outlet valve.

21. The method according to claim 15 wherein said filter is permanently secured to said container.

22. The method according to claim 15 wherein said container, said valves and said filter constitute a replaceable unit.

23. The method according to claim 15 wherein a source of a fill gas is fluidically coupled to said system first coupler part; and wherein said inlet coupling part is mated to said system first coupling part to provide a flow path between said inlet valve and said source of fill gas.

24. The method according to claim 15 wherein said container has a top and said outlet coupling part is displaced farther from said container top than said inlet coupling part.

25. The apparatus according to claim 9 wherein said container has a top and said outlet coupling part is displaced farther from said container top than said inlet coupling part.

26. The device according to claim 1 wherein said container has a top and said outlet coupling part is displaced farther from said container top than said inlet coupling part.

* * * * *